United States Patent
Vive et al.

(10) Patent No.: US 12,071,853 B2
(45) Date of Patent: Aug. 27, 2024

(54) FREE-TURBINE TURBOMACHINE COMPRISING EQUIPMENT DRIVEN BY THE FREE TURBINE

(71) Applicant: SAFRAN HELICOPTER ENGINES, Bordes (FR)

(72) Inventors: Loïs Pierre Denis Vive, Moissy-Cramayel (FR); Thomas Drouin, Moissy-Cramayel (FR); Olivier Bedrine, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/553,819

(22) PCT Filed: Mar. 31, 2022

(86) PCT No.: PCT/FR2022/050612
§ 371 (c)(1),
(2) Date: Oct. 3, 2023

(87) PCT Pub. No.: WO2022/214757
PCT Pub. Date: Oct. 13, 2022

(65) Prior Publication Data
US 2024/0183283 A1 Jun. 6, 2024

(30) Foreign Application Priority Data
Apr. 8, 2021 (FR) ........................................ 2103596

(51) Int. Cl.
*F01D 15/12* (2006.01)
*B64D 27/10* (2006.01)
(Continued)

(52) U.S. Cl.
CPC ............. *F01D 15/12* (2013.01); *B64D 27/10* (2013.01); *F02C 7/268* (2013.01); *F02C 7/32* (2013.01); *F05D 2220/76* (2013.01)

(58) Field of Classification Search
CPC .......... F01D 15/12; F01D 15/10; F01D 25/36; F05D 2220/76; F05D 2220/32;
(Continued)

(56) References Cited

U.S. PATENT DOCUMENTS 3,514,945 A      6/1970   Austin
7,975,465 B2 *  7/2011   Morris ...................... F02C 6/08
                                                                            60/39.282
(Continued)

FOREIGN PATENT DOCUMENTS

| EP | 3964700 A1 | 3/2022 |
|---|---|---|
| FR | 2921423 A1 | 3/2009 |
| FR | 2929324 A1 | 10/2009 |

OTHER PUBLICATIONS

Search Report and Written Opinion issued in International Application No. PCT/FR2022/050612, mailed on Jul. 7, 2022.
(Continued)

*Primary Examiner* — Dapinder Singh
(74) *Attorney, Agent, or Firm* — Bookoff McAndrews, PLLC

(57) ABSTRACT

A turbomachine including a gas generator endowed with a first shaft, a gear box, at least one reversible electric machine coupled to the gear box, and a free turbine endowed with a second shaft and rotationally driven by a gas stream of the gas generator and at least one accessory coupled to the accessory gear box, wherein the turbomachine includes a first mechanical coupling means configured to mechanically couple said first mechanical shaft to the accessory gear box in a first configuration and to mechanically uncouple said first mechanical shaft from the accessory gear box in a
(Continued)

second configuration, and a second mechanical coupling means configured to mechanically couple said second mechanical shaft to the accessory gear box in a first configuration and to mechanically uncouple said second mechanical shaft from the accessory gear box in a second configuration.

7 Claims, 3 Drawing Sheets

(51) Int. Cl.
  *F02C 7/26*   (2006.01)
  *F02C 7/268*   (2006.01)
  *F02C 7/32*   (2006.01)

(58) Field of Classification Search
  CPC ...... F05D 2220/323; F02C 7/268; F02C 7/32; F02C 7/36; F02C 7/275; F02C 7/277; F02C 3/04; F02C 3/107; F02C 3/10; F02C 6/08; F02C 9/18; B64D 27/10; Y02T 50/60
  See application file for complete search history.

(56) References Cited

U.S. PATENT DOCUMENTS

| | | | |
|---|---|---|---|
| 11,479,348 B2 * | 10/2022 | Gons | F02C 6/206 |
| 2013/0098052 A1 * | 4/2013 | Bedrine | F02C 6/00 |
| | | | 60/39.15 |
| 2018/0252161 A1 | 9/2018 | Munevar | |
| 2020/0298988 A1 * | 9/2020 | LaTulipe | B64D 35/08 |

OTHER PUBLICATIONS

Search Report issued in French Application No. 2103596, mailed on Dec. 13, 2021.

* cited by examiner

[Fig. 1]
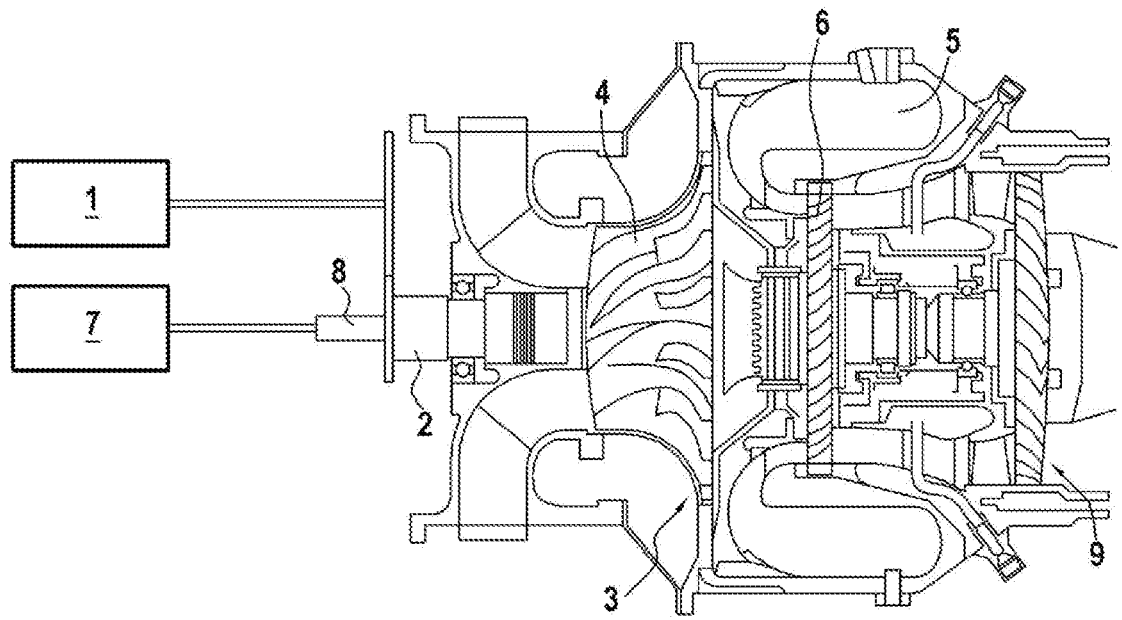
PRIOR ART
[Fig. 2]
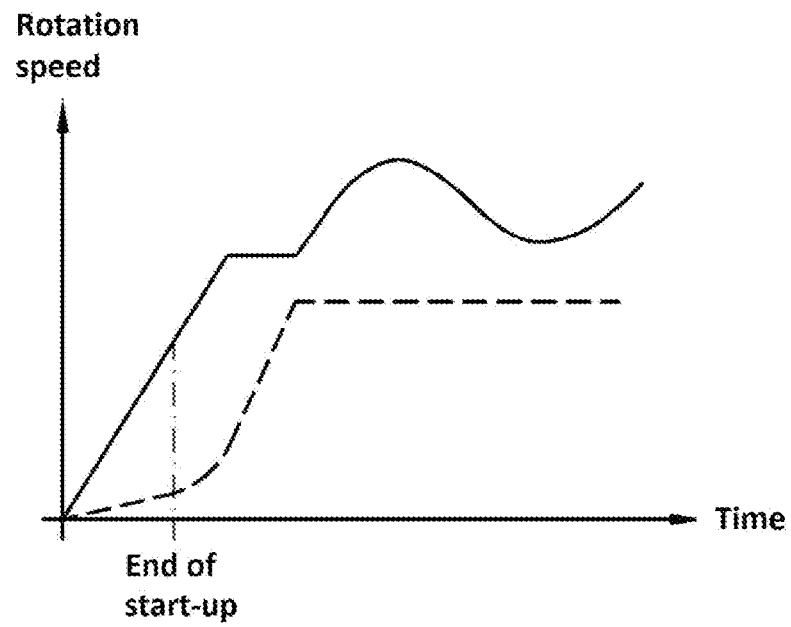
PRIOR ART

[Fig. 3]
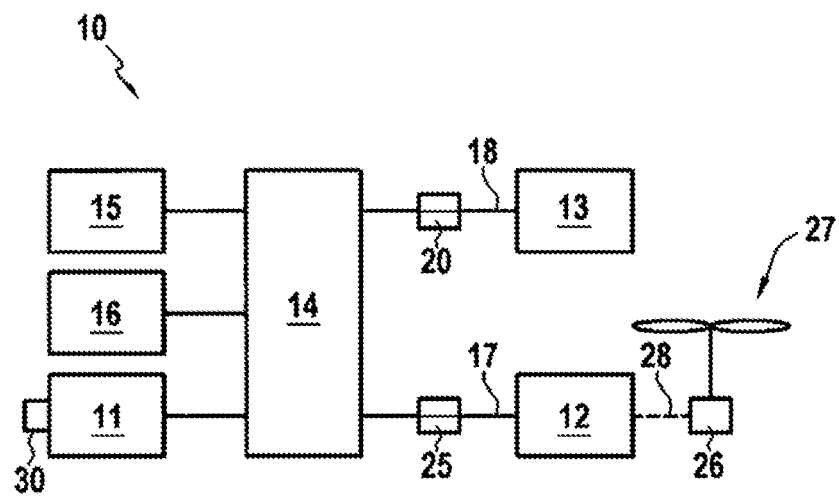
[Fig. 4]
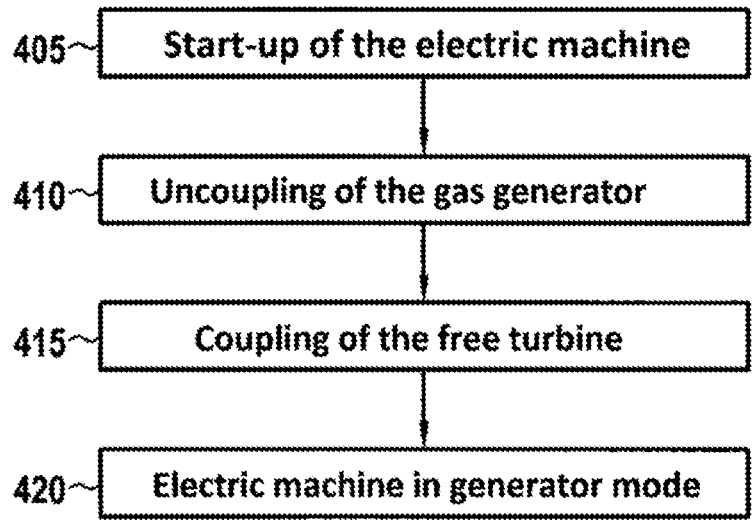

[Fig. 5]
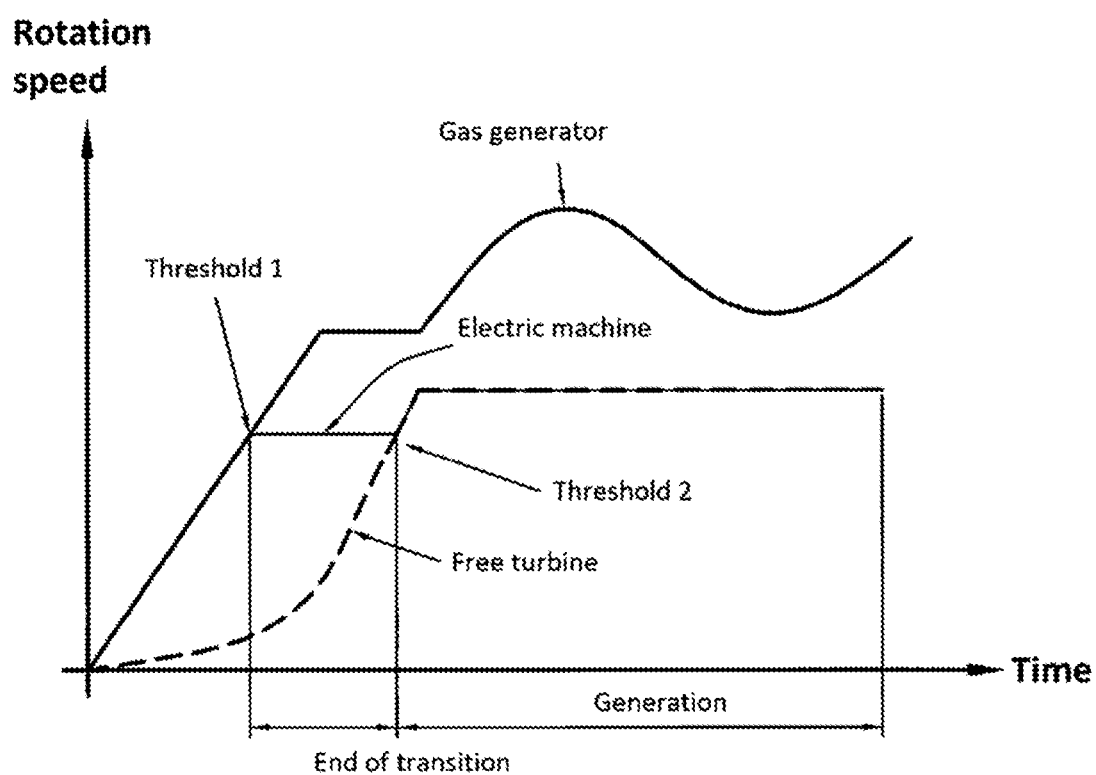

FREE-TURBINE TURBOMACHINE COMPRISING EQUIPMENT DRIVEN BY THE FREE TURBINE

CROSS-REFERENCE TO RELATED APPLICATIONS

This is a National Stage Application under 35 U.S.C. § 371 of International Application No. PCT/FR2022/050612, filed Mar. 31, 2022, now published as WO 2022/214757 A1, which claims priority to French Patent Application No. 2103596, filed on Apr. 8, 2021.

TECHNICAL FIELD

This invention relates to the general field of aeronautical free-turbine turbomachines, particularly for turbojet engines or turbogenerators, and more particularly for an architecture of such a turbomachine allowing the driving of equipment via the free turbine without compromising the operation of the equipment during the start-up of the turbomachine.

PRIOR ART

A free-turbine turbomachine for helicopters generally includes a gas generator and a free turbine rotationally driven by the stream of gas generated by the gas generator, as well as a reversible electric machine which can be coupled to the gas generator, particularly to rotate the gas generator during a start-up phase of the turbomachine.

Conventionally, the gas generator includes at least one compressor and one turbine rotationally coupled. The operating principle is as follows: the cool air entering the turbojet engine is compressed due to the rotation of the compressor before being sent to a combustion chamber where it is mixed with fuel. The gas burned during the combustion is then expelled at high speed.

A first expansion then occurs in the turbine of the gas generator, during which the latter extracts the energy necessary for the driving of the compressor and the equipment. The turbine of the gas generator does not absorb all the kinetic energy of the burned gas and the excess kinetic energy is equivalent to the stream of gas generated by the gas generator. The latter therefore provides kinetic energy to the free turbine such that a second expansion occurs in the free turbine which converts this kinetic energy into mechanical energy in order to drive a receiving member, such as the rotor of the helicopter.

During the start-up phase of the turbojet engine, or of the turbomachine in general, it is necessary to rotationally drive the gas generator, i.e. rotationally drive the compressor coupled to the turbine along with the different equipment items which are connected. As mentioned in the introduction, this is precisely one of the roles of the reversible electric machine which is usually an electric motor able to operate reversibly as an electric generator.

As illustrated in FIG. 1 which schematically shows a free turbine turbomachine of the prior art, for start-up, an electric machine 1 in motor operation drives the mechanical shaft 2 of the gas generator 3, until the rotation thereof is sustained by the combustion of fuel. The rotating of the shaft of the gas generator by the reversible electric machine operating in motor mode during the start-up phase moreover makes it possible to drive equipment items, not shown in this figure and which can be driven by the shaft 2 via an accessory gear box. This makes it possible to supply the turbomachine with fuel and oil and to circulate air in the compressor 4 and therefore to convey compressed air into the combustion chamber 5 to begin the combustion. This combustion then produces the gas stream used to rotationally drive the turbine 6 of the gas turbine 3, after which the compressor 4 and the equipment are rotationally driven by the turbine 6 without the assistance of the electric machine, which means that the gas generator 3 operates independently, implying the end of the start-up phase of the turbomachine.

Furthermore, for a turbomachine like that illustrated in FIG. 1, a receiver 7 engaged on the shaft 8 of the free turbine 9, such as a second electric machine or a helicopter rotor where applicable associated with a main gear box, makes it possible to meet the need for a supply of mechanical power or generation of high power.

On a turbomachine as illustrated in FIG. 1, the equipment such as the fuel pump and the oil pump are mechanically connected to the shaft 2 of the gas generator 3 via the accessory gear box.

The equipment items requiring a draw of mechanical energy to be rotationally driven, for example pumps, are also known as accessories and are generally mounted on an accessory gear box which comprises at least one gear train to adapt the speeds of rotation of the accessories.

Once the start-up phase is finished, it is known to use the reversible electric machine in a generator operating mode to produce non-propulsive electric energy (28V mains for example), to supply electricity to the electric apparatuses. The electric machine 1 generates electric energy by drawing mechanical power off the shaft 2 of the gas generator 3, the rotational kinetic energy drawn off the gas generator being converted into electric energy by said machine.

This electric machine 1 can be non-reversible and composed of a single starter, if there is no need for electric power generation.

FIG. 2 illustrates the variation, as a function of time and of the possible configuration of the turbogenerator, of the rating of the shaft 2 of the gas generator 3 in solid lines and the rating of the shaft 8 of the free turbine 9 in dotted lines. It can be seen that the variation in the rating of the two shafts is independent. The point of exit from the start-up phase is also indicated.

For a turbojet engine, with a free turbine and a conventional start-up system using a reversible electric machine, the mechanical draw off the shaft of the gas generator serving to generate electric power by the reversible electric machine 1 in a generator operating mode adversely affects the performance of the gas generator.

This is because the variation, over the flight, in the mechanical power drawn by the electric machine 1 and the equipment off the gas generator manifests as a movement of the operating line of the engine on the compressor map. This movement corresponds to a surge margin for which provision must be made, which has the consequence of:

penalizing the optimization of the operating line of the engine, by prohibiting the use of the compressor at an optimal pressure ratio;
hence degrading the stabilized performance, with an impact on specific fuel consumption.

With such a configuration, a solution to avoid drawing mechanical power off the gas generator to generate electricity consists in using an electric machine for the start-up function with a declutching system, and another electric machine secured to the free turbine for the generation function as illustrated in FIG. 1, which is penalizing in terms of mass and cost, in addition to being rarely used in practice.

A known architecture for starting a free turbine turbomachine without the addition of a specific generator is disclosed in the document FR 2 929 324. This technical solution makes it possible to reduce the total mass and the cost and to increase the reliability of the turbogenerator with respect to a turbomachine comprising two electric machines as in FIG. 1. The technical solution described in this document consists in a switching system using two free wheels making it possible to start the gas generator of a free turbine turbojet engine, then to generate non-propulsive electric energy by drawing mechanical energy off the free turbine shaft. The equipment remains driven via the gas generator and the accessory gear box.

This solution in particular makes it possible to improve the transient performance of the gas generator, by avoiding the drawbacks of a draw of kinetic energy off the gas generator, and in particular the problem of the movement of the operating line of the engine on the compressor map due to the variation, during flight, of the mechanical power drawn by the electric machine.

This architecture with two free wheels is advantageous in the context of a helicopter turbomachine in order to avoid driving the main rotor via the electric machine during the start-up phase. Specifically, since the free turbine of the turbomachine is mechanically connected to the main rotor, a coupling between the shaft of the free turbine and the main rotor which could not be uncoupled during the start-up phase would require overdimensioning at least the energy storage system so that the electric machine has access to enough energy to rotationally drive the entire kinetic line (including the main rotor).

In order to improve the performance of the free turbine turbomachine, it would also be beneficial to be able to drive all the equipment of the turbomachine via the free turbine. But since the performance of the fuel pump is associated with its rotation speed, the variation in the speed of the free turbine after the start-up phase would not allow, or would severely impact, the design of the fuel system assembly to guarantee the correct start-up of the turbomachine.

SUMMARY OF THE INVENTION

For this purpose, this invention makes provision for a free turbine turbomachine driving one or more electric machines of sufficient power endowed with a simplified switching system making it possible to optimize mass, cost and reliability.

In a subject of the invention, provision is made for a turbomachine including a gas generator endowed with a first mechanical shaft, at least one reversible electric machine, a free turbine endowed with a second mechanical shaft and rotationally driven by a stream of gas generated by the gas generator, an accessory gear box, a mechanical power transmission in the context of a helicopter and at least one accessory coupled to the accessory gear box.

According to a technical feature of the invention, the turbomachine further comprises a first mechanical coupling means configured to mechanically couple said first mechanical shaft to the accessory gear box in a first configuration and to mechanically uncouple said first mechanical shaft from the accessory gear box in a second configuration, and a second mechanical coupling means configured to mechanically couple said second mechanical shaft to the accessory gear box in a first configuration and to mechanically uncouple said mechanical shaft from the accessory gear box in a second configuration, the electric machine being dimensioned to drive the gas generator and said at least one accessory during the start-up of the turbomachine.

The turbomachine according to the invention comprising an electric machine and two mechanical coupling means makes it possible both to mutualize the functions of starting up the gas generator and generating high electric power on the electric machine, and to avoid the free turbine and the rotor, in the case of a mechanical transmission, from being driven by the electric machine during the start-up phase, which makes it possible to reduce the inertia and the resistive torque at start-up. Furthermore, this configuration allows the free turbine to drive the accessories and the rotor once the turbomachine has started. Specifically, the electric machine makes it possible to initiate both the rotation of the accessories, and that of the gas generator until the gas generator can operate independently, since once the free turbine exceeds a certain power above which the second mechanical coupling means mechanically couples the second mechanical shaft to the accessory gear box, the electric machine can operate in generator mode by being driven by the free turbine via the accessory gear box to thus supply electric power to other parts.

Furthermore, the architecture according to the invention makes it possible, in the event of rupture of the free turbine shaft during operation, to directly affect the driving of the accessories (including the fuel pump) having the direct effect of instantly switching off the engine and therefore limiting the overspeed of the free turbine. This architecture has the effect of protecting the free turbine in overspeed.

According to a first aspect of the turbomachine, the turbomachine may further comprise a control unit of the electric machine, the control unit being configured to put the electric machine in motor mode during the start-up of the turbomachine, and to put the electric machine in generator mode when the second coupling means is put in its first configuration.

By uncoupling the gas generator from the accessory gear box once the gas generator has reached a rating allowing it to operate independently, the electric power to be delivered by the electric machine (up to the power rating of the free turbine) is reduced since the quantity of energy required is now only that needed to drive the accessories.

The transitional phase between the independent operation of the gas generator and the coupling of the free turbine to the accessory gear box to allow the operation of the electric machine in gas generator mode, during which the electric machine continues to operate in motor mode but only for the accessories, thus makes it possible to keep the speed of rotation of the equipment items, or accessories, high enough to guarantee their correct operation.

According to a second aspect of the turbomachine, the second mechanical coupling means is put in its second configuration from the start-up phase of the turbomachine until an operating parameter of the second mechanical shaft or of the second mechanical coupling means has exceeded a power threshold above which the free turbine is in a power configuration allowing it to drive said at least one accessory without the assistance of the electric machine.

The value of the operating parameter corresponding to the threshold above which the free turbine is in its power configuration is preferably greater than the value that said operating parameter has when the first shaft reaches the speed threshold of leaving the start-up phase. In other words, the threshold above which the free turbine can drive the accessories occurs after the moment when the gas generator has become independent. The electric machine is configured to operate in gas generator mode once said parameter of the second mechanical shaft or of the electric machine has exceeded the power threshold.

According to a third aspect of the turbomachine, the first mechanical coupling means may comprise a first free wheel and the second mechanical coupling means may comprise a second free wheel.

According to a fourth aspect of the turbomachine, the first mechanical coupling means and the second mechanical coupling means may be contained in a casing of the accessory gear box.

The pinions of the accessory gear box thus make it possible to adapt the speeds for the equipment, such as a fuel pump or an oil pump, mechanically coupled to the first mechanical shaft, i.e. the gas generator.

According to a fifth aspect of the turbomachine, the turbomachine may further comprise an additional accessory gear box connected to the first mechanical shaft to constantly couple additional accessories directly to the gas generator.

In another aspect of the invention, provision is made for an aircraft with rotary wings comprising at least one turbomachine as defined above, a main gear box and a mechanical coupling between the free turbine and said main gear box.

BRIEF DESCRIPTION OF THE DRAWINGS

FIG. 1, already described, is a simplified schematic view of a free turbine turbomachine of the prior art.

FIG. 2, already described, is a graphic representation of the variation, as a function of time and of the possible configuration of the turbogenerator, of the rating of the shaft of the gas generator and the rating of the shaft of the free turbine of the turbomachine of FIG. 1.

FIG. 3 is a diagram of a free turbine turbomachine according to an embodiment of the invention.

FIG. 4 shows a flow chart of a method for controlling the start-up of the turbomachine of FIG. 3 according to a mode of implementation.

FIG. 5 is a graphic representation of the variation, as a function of time and of the possible configuration of the turbogenerator, of the rating of the shaft of the gas generator and the rating of the shaft of the free turbine of the turbomachine of FIG. 3.

DESCRIPTION OF THE EMBODIMENTS

FIG. 3 schematically shows a free turbine turbomachine 10 according to an embodiment of the invention.

The turbomachine 10 comprises an electric machine 11, a free turbine 12, a gas generator 13, an accessory gear box 14, a fuel pump 15 and an oil pump 16.

The gas generator 13 comprises a shaft 18 connected and mechanically coupled to the accessory gear box 14 via a first mechanical coupling means 20. The first mechanical coupling means 20 is configured to mechanically couple the shaft 18 of the gas generator 13 to the accessory gear box 14 in a first configuration, and to mechanically uncouple it from the accessory gear box 14 in a second configuration particularly in order to uncouple the shaft 18 of the gas generator 13 with respect to the shaft 17 and the electric machine 11. The shaft 18 of the gas generator 13 is thus selectively coupled to the electric machine 11 via the accessory gear box 14.

The free turbine 12 comprises a shaft 17 connected and mechanically coupled to the accessory gear box 14 via a second mechanical coupling means 25. The accessory gear box 14 is mechanically coupled to the electric machine 11. The second mechanical coupling means 25 is configured to mechanically couple the shaft 17 of the free turbine 12 to the accessory gear box 14 in a first configuration, and to mechanically uncouple it from the accessory gear box 14 in a second configuration particularly in order to uncouple the shaft 17 of the free turbine 12 with respect to the shaft 18 and the electric machine 11. The shaft 17 of the free turbine 12 is thus selectively coupled to the electric machine 11 via the accessory gear box 14.

The turbomachine 10 further comprises a main gear box 26 and a main rotor 27. The free turbine 12 can also comprise another mechanical shaft 28, which can be an extension of the shaft 17, and which connects the free turbine 12 to the main gear box 26, the main gear box 26 also being connected to the main rotor 27. The free turbine is thus connected to the main rotor 27 via the main gear box 26.

The accessory gear box 14 is also mechanically coupled to the fuel pump 15, on the one hand, and to the oil pump 16, on the other. In other embodiments other accessories may be mechanically coupled to the accessory gear box 14.

The first mechanical coupling means 20 and the second mechanical coupling means 25 each comprise a free wheel.

The turbomachine 10 further comprises a unit 30 for controlling the electric machine 11 configured to put the electric machine 11 in a motor mode during a start-up phase of the turbomachine 10 and put the electric machine 11 in a generator mode when the second mechanical coupling means 25 is put in its first configuration.

The first coupling means 20 is mechanically configured to have the electric machine 11 mechanically coupled to the gas generator 13 via the shaft 18 during the start-up of the turbomachine 10.

Furthermore, the first coupling means 20 is mechanically configured to uncouple the gas generator 13 from the electric machine 11 when the gas generator 13 reaches a speed threshold of exit of the start-up phase.

The second coupling means 25 is mechanically configured to have the electric machine 11 mechanically coupled to the free turbine 12 via the shaft 17 when the free turbine 12 is in a power configuration allowing it to drive said at least one accessory without the assistance of the electric machine 11.

FIG. 4 shows a flow chart of a method for controlling the start-up of the turbomachine 10 according to a mode of implementation of the invention.

FIG. 5 graphically represents the variation, as a function of the time and of the possible configuration of the turbomachine, of the rating of the shaft 18 of the gas generator 13 in solid lines and, in dotted lines, the rating of the shaft 17 of the free turbine 12 of the turbomachine 10 of FIG. 3 when it starts up using the method of FIG. 4.

The method for starting the turbomachine 10 comprises a first step 405 in which the electric machine 11 is put in motor mode and started to begin a rotation of the shaft 18 of the gas generator 13 via the accessory gear box 14, the first coupling means 20 being put in its first configuration making it possible to couple the shaft 18 of the gas generator 13 to the accessory gear box 14, and the second coupling means 25 being put in its second configuration making it possible to mechanically decouple the shaft 17 of the free turbine 12 from the accessory gear box 14. Specifically, upon the rotating of the accessory gear box 14 by the electric machine 11, the first mechanical coupling means 20, which can be a free wheel, automatically transmits the necessary torque to rotate the gas generator 13.

In a second step 410, when the rating of the shaft 18 of the gas generator 13 exceeds a first threshold, the gas generator 13 can operate independently, i.e. without any assistance from the electric machine 11. At this time, the first coupling means 20 is put in its second configuration to uncouple the gas generator 13 from the accessory gear box 14 and therefore from the electric machine 11.

The electric machine 11 however remains in a motor operating mode to drive the accessories 15 and 16 via the accessory gear box 14.

In a third step 415, when the rating of the shaft 17 of the free turbine 12 exceeds a second threshold, the free turbine 12 is in so-called power operation, allowing it to drive the accessories. At this time, the second coupling means 25 is put in its first configuration to mechanically couple the free turbine 12 to the accessory gear box 14 and thus drive the accessories 15 and 16.

In a fourth step 420, the electric machine 11 is, at the same time as the third step 415, put in a generator operating mode.

Thus, the electric machine 11 can operate as an electric generator and produce electric energy from the rotation of the shaft 17 of the free turbine driven by the rotary movement of the free turbine 12 itself driven by the stream of gas delivered by the gas generator 13.

The phase of transition between the independent operation of the gas generator 13 and the power operation of the free turbine 12, during which the electric machine 11 continues to operate in motor mode but only to provide the driving of the accessories, thus makes it possible to keep a speed of rotation of the equipment or accessories that is high enough to guarantee their correct operation.

The free turbine turbomachine according to this invention thus makes it possible to optimize the mass, cost and reliability of the switching system and therefore of the turbomachine.

The invention claimed is:

1. A turbomachine including a gas generator comprising a first mechanical shaft, an accessory gear box, at least one reversible electric machine coupled to the accessory gear box, a free turbine provided with a second mechanical shaft and rotationally driven by a stream of gas generated by the gas generator, and at least one accessory coupled to the accessory gear box,
   wherein the turbomachine further comprises a first mechanical coupling means configured to mechanically couple said first mechanical shaft to the accessory gear box in a first configuration of the first mechanical coupling means and to mechanically uncouple said first mechanical shaft from the accessory gear box in a second configuration of the first mechanical coupling means, and a second mechanical coupling means configured to mechanically couple said second mechanical shaft to the accessory gear box in a first configuration of the second mechanical coupling means and to mechanically uncouple said second mechanical shaft from the accessory gear box in a second configuration of the second mechanical coupling means, the electric machine being dimensioned to drive the gas generator and said at least one accessory during the start-up of the turbomachine.

2. The turbomachine as claimed in claim 1, further comprising a control unit of said at least one electric machine, the control unit being configured to put the electric machine in motor mode during the start-up of the turbomachine, and to put the electric machine in generator mode when the second coupling means is put in its first configuration.

3. The turbomachine as claimed in claim 2, wherein the second mechanical coupling means is put in its second configuration from the start-up phase of the turbomachine until a parameter of the second mechanical shaft or of the second mechanical coupling means has exceeded a power threshold above which the free turbine is in a power configuration allowing it to drive said at least one accessory without the assistance of the electric machine.

4. The turbomachine as claimed in claim 1, wherein the first mechanical coupling means comprises a first free wheel and the second mechanical coupling means comprises a second free wheel.

5. The turbomachine as claimed in claim 1, wherein the first mechanical coupling means and the second mechanical coupling means are contained in a casing of the accessory gear box.

6. The turbomachine as claimed in claim 1, further comprising an additional accessory gear box connected to the first mechanical shaft to constantly couple additional accessories directly to the gas generator.

7. An aircraft with rotary wings comprising at least one turbomachine as claimed in claim 1, a main gear box and a mechanical coupling between the free turbine and said main gear box.

* * * * *